(12) United States Patent
Williams (10) Patent No.: US 10,633,109 B2
(45) Date of Patent: *Apr. 28, 2020

(54) METHOD AND MATERIAL FOR ACCOMPLISHING IGNITION MITIGATION IN TANKS CONTAINING FLAMMABLE LIQUID

(71) Applicant: Jetaire Aerospace, LLC, Atlanta, GA (US)

(72) Inventor: Michael D Williams, Fayetteville, GA (US)

(73) Assignee: JETAIRE AEROSPACE, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/816,150

(22) Filed: Nov. 17, 2017

(65) Prior Publication Data

US 2018/0339789 A1 Nov. 29, 2018

Related U.S. Application Data

(63) Continuation-in-part of application No. 14/851,511, filed on Sep. 11, 2015, now Pat. No. 9,849,998.

(51) Int. Cl.
*B64D 37/32* (2006.01)
*B64D 37/06* (2006.01)
*B64F 5/00* (2017.01)

(52) U.S. Cl.
CPC ............. *B64D 37/32* (2013.01); *B64D 37/06* (2013.01); *B64F 5/00* (2013.01)

(58) Field of Classification Search
CPC .. B64D 2037/325; B64D 37/32; B64D 37/08; B64D 37/06; B23P 2700/01
See application file for complete search history.

(56) References Cited

U.S. PATENT DOCUMENTS 4,013,190 A * 3/1977 Wiggins .................. A62C 4/00
220/501
4,294,279 A * 10/1981 Wyeth .................... B64D 37/32
137/264

(Continued)

FOREIGN PATENT DOCUMENTS

WO    WO 2015/170088    11/2015

OTHER PUBLICATIONS

Transcription and Frame Captures from "China Lake Video," Naval Weapons Center, China Lake, CA; Jun. 1989, pp. 1-89.

(Continued)

*Primary Examiner* — Christopher J Besler
(74) *Attorney, Agent, or Firm* — Thomas | Horstemeyer, LLP; Jason M. Perilla (57) ABSTRACT

A method utilizing quantities of flexible foam material inserted into a fuel tank, thereby providing ignition mitigation and minimizing the risk of explosion in the tank. The foam material is sculpted into a few, or a substantial quantity of foam blocks. In large-scale installations, the blocks are labeled according to exact placement within a stacking pattern that replicates the tank interior. The blocks are inserted by technicians through existing access ports until the tank is filled, excepting minimal planned void spaces. The foam material establishes ignition mitigation by acting as an ignition blocker, mechanically interfering with the compression wave created by a flame front in an explosion, and changing the vaporous mixture-above the fuel level in the tank. Upon completion of foam insertion, the fuel tank is filled with purging fluid, drained through a filter until no debris is found, and a new maximum fuel quantity recalibrated.

31 Claims, 10 Drawing Sheets

(56) References Cited

U.S. PATENT DOCUMENTS

| | | | |
|---|---|---|---|
| 4,352,851 A * | 10/1982 | Heitz | A62C 3/06 |
| | | | 442/222 |
| 6,358,591 B1 | 3/2002 | Smith | |
| 6,408,979 B1 | 6/2002 | Forbes et al. | |
| H2054 H | 12/2002 | Bennett et al. | |
| 6,803,090 B2 | 10/2004 | Castiglione et al. | |
| 7,341,113 B2 | 3/2008 | Fallis et al. | |
| 9,321,347 B2 | 4/2016 | Cragel et al. | |
| 9,849,998 B2 * | 12/2017 | Williams | B64D 37/32 |
| 2011/0272526 A1 | 11/2011 | Barbosa et al. | |
| 2014/0076285 A1 | 3/2014 | Martin et al. | |
| 2014/0216416 A1 | 8/2014 | Novaco et al. | |
| 2017/0096234 A1 | 4/2017 | Martindale et al. | |

OTHER PUBLICATIONS

SAE International; "Aerospace Information Report". Reticulated Polyurethane Foam Explosion Suppression Material for Fuel Systems and Dry Bays. (1991). pp. 1-38.

Appendix 2 Claim chart of independent claims 1, 17, and 32 for U.S. Appl. No. 16/165,609, as amended Sep. 26, 2019.

Appendix 1 Claim chart of independent claims 26 and 41 for U.S. Appl. No. 15/816,150, as amended Sep. 26, 2019.

Aviation Rulemaking Advisory Committee "Foam" Jul. 21, 1998 pp. 1-52.

AIR4170, S.A.E., (1998) "Reticulated Polyurethane Foam Explosion Suppression Material for Fuel System and Dry Bays."

* cited by examiner

METHOD AND MATERIAL FOR ACCOMPLISHING IGNITION MITIGATION IN TANKS CONTAINING FLAMMABLE LIQUID

CROSS-REFERENCES TO RELATED APPLICATIONS

This is a continuation-in-part patent application which claims the benefit and priority of parent U.S. Published patent application Ser. No. 14/851,511 filed on Sep. 11, 2015, and currently co-pending before the USPTO, by reference as though said parent application Ser. No. 14/851,511 appears fully herein.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

The inventive concept disclosed relates generally to methods employed to prevent and/or minimize fuel ignition, fire, and/or explosion in the interior of tanks containing fuel or other types of flammable liquids. Different systems, materials, and methods have been used in an attempt to achieve this end, including inert gaseous material, which features active systems using Halon 1301 inerting and nitrogen inerting in some military aircraft. "Reactive" systems have been designed that react to the initiation of an explosion and discharge a substance intended to suppress the internal explosion, hopefully within milliseconds. These reactive systems axe initiated by either physical or chemical means.

In the preferred embodiment of the instant inventive concept there are disclosed different embodiments of specific methods of installing accurately measured quantities of flexible foam material to fill the internal space of tanks that bold flammable liquid, with particular emphasis on aircraft fuel tanks.

(2) Background

Since 1959, there have been sixteen documented incidents of fuel task ignition events in aircraft. These fuel tank ignition events have resulted in 542 fatalities, 11 hull losses and 3 incidents causing substantial damage. The causes of the fuel tank ignition events were attributed as follows: 4 were caused by external wing fires, 4 by electrostatics, 3 by faulty fuel pumps or wiring, 2 by lightning, and 3 to unknown causes.

On Jul. 17, 1996, TWA Flight 800 sustained an in-flight break-up after taking off from Kennedy International Airport in New York, resulting in 230 fatalities. The National Transportation Safety Board ("NTSB") conducted a lengthy investigation and determined that ignition of the flammable fuel/air mixture in a center wing fuel tank had occurred, causing an explosion that disintegrated the aircraft in flight. Although the exact ignition source could not be determined, the NTSB concluded that the most likely ignition source was a short circuit outside the center wing fuel tank that allowed excessive voltage to enter the tank through electrical wiring associated with the fuel quantity indication system (FQIS).

The NTSB announced their official findings regarding the TWA 800 accident at a public meeting held on Aug. 22 and 23, 2000 in Washington, D.C. Primarily as a consequence of TWA Flight 800, the Federal Aviation Administration ("FAA") issued numerous airworthiness directives intended to reduce possible ignition sources and thereby the risk of another fuel tank explosion. On May 7, 2001, the FAA promulgated rulemaking to establish several new transport category airplane fuel tank safety requirements (66 Federal Registry 23086, May 7, 2001). The rulemaking, effective Jun. 6, 2001, included Amendment 21-78, Amendment 25-102 and Special Federal Aviation Regulation ("SFAR") No. 88 entitled "Transport Airplane Fuel Tank System Design Review, Flammability Reduction and Maintenance Requirements." SFAR No. 88 required that type certificate holders and supplemental type certificate holders conduct a revalidation of the fuel tank system designs on the existing fleet of transport category airplanes capable of carrying thirty (30) or more passengers or a payload of 7,500 pounds or more.

Legislation was enacted as 14 CFR § 25.981 (Rule 25.981) and FAA Advisory Circulars AC 25.981-1B and 25.981-2 were issued to provide compliance guidance. Compliance with Rule 25.981 required each applicant to develop a failure analysis for the fuel tank installation to substantiate that ignition sources would not be present in the fuel tanks. The requirements of this section are in addition to the more general propulsion failure analyses requirements of 14 CFR 25.901 and 14 CFR 25.1309 that have been applied to propulsion installations.

14 CFR § 25.981 (a) (3) defines three failure scenarios that must be addressed in order to show compliance with the rule (known as the "three phases" of compliance):

Phase A. Each single failure, regardless of the probability of occurrence of the failure, must not cause an ignition source;

Phase B. Each single failure, regardless of the probability of occurrence, in combination with any latent failure condition not shown to be at least extremely remote (i.e., not shown to be extremely remote or extremely improbable), must not cause an ignition source; and Phase C. All combinations of failures not shown to be extremely improbable must not cause an Ignition source.

Compliance with 14 CFR § 25.981 (Amendment 25-125) requires investigation of the airplane fuel tank system using analytical methodology and documentation currently used by the aviation industry to demonstrate compliance with 14 CFR 25.901 and 25.1309 but with consideration of unique requirements included in this amendment of this paragraph.

The Federal Aviation Administration (FAA) mandates forced certificate holders to develop and implement all design changes required to demonstrate that their aircraft meet the new ignition prevention requirements and to develop fuel lank maintenance and inspection instructions. Specifically, SFAR No. 88 contains six (6) requirements applicable to transport category aircraft: 1) determine the highest temperature allowed before ignition occurs; 2) demonstrate that this temperature is not achieved anywhere on the aircraft where ignition is possible; 3) demonstrate that ignition could not occur as a result of any single point failure; 4) Establish Critical Design Configuration Control Limitations ("CDCCL"), inspections or other procedures to prevent changes to the aircraft that would result in re-introduction or creation of ignition sources; 5) develop visible means to identify critical features of the aircraft where maintenance, repairs or alterations would affect areas or systems of possible ignition; and 6) design of fuel tanks must contain a means to minimize development of flammable vapors in fuel tanks or a means to mitigate the effects of ignition within fuel tanks.

Maintenance of ignition source prevention features is necessary for the continued operational safety of an airplane's fuel lank system. One of the primary functions of the fuel tank system is to deliver fuel in a safe and reliable manner. Preventing ignition sources is as important a function of the fuel system as the delivery and gauging of fuel. The failure of any ignition source prevention feature may not immediately result in an ignition event, but a failure warrants maintenance for continued airworthiness because the failure could eventually have a direct adverse effect on operational safety.

There have been various solutions proposed and implemented to comply with the mandated transport category aircraft fuel tank ignition mitigation requirements. Examples of compliance methods implemented include electronic solutions such as the installation of Transient Suppression Devices ("TSD"), Ground Fault Interrupters ("GFI"), and similar current limiting devices. These devices are deficient in that they retain possible failure rates that a "passive," non-electronic solution could resolve. Clearly, there is a need for a simplified and reliable solution to make implementation of the SFAR No. 88 compliance feasible. A better solution would be a less expensive, passive solution that is applicable to commercial and private aircraft and other vehicles.

(3) Description of the Related Art, including information disclosed under 37 CFR 1.97 and 1.98.

There are no known uses of flexible foam material in the same manner and for purposes similar to the inventive disclosure. However at least one entity, BAE Systems, PLC, utilizes a "tie assembly" as structural components within the interior of a liquid storage tank for the purpose of reducing hydrodynamic ram pressure and minimizing possibility of catastrophic failure of the fuel tank in the event of projectile impact. Ref. WO 2015/170088 A1, published Nov. 12, 2015.

U.S. Published patent application Ser. No. 14/851,511 (Sep. 11, 2015) A method utilizing specific quantities of flexible foam material inserted into a fuel tank, thereby providing ignition mitigation and minimizing the risk of explosion in the tank. The foam material is sculpted into one, a few, or a substantial quantity of foam blocks. The blocks may be labeled according to exact placement within a stacking pattern that replicates the tank interior. The blocks are inserted by technicians through existing access ports until the tank is filled. The foam acts as an ignition blocker, mechanically interfering with the compression wave created by a flame front in an explosion, and changing the vaporous mixture above the fuel level (ullage) in the tank.

BRIEF SUMMARY OF THE INVENTIVE CONCEPT

The method and materials discussed in this document will focus primarily on the use of one or more conformed, interrelated pieces of flexible foam material shaped to replicate the inside dimensions of an aircraft fuel tank. The inventive concept, method, and materials disclosed herein are equally applicable to tanks designed and constructed for use in various types of vehicles and flammable liquid storage tanks. However, for the sake of simplicity and ease of explanation, most of the discussion will be centered on the preferred embodiment, which is concerned with aircraft fuel tanks. The term "aircraft fuel tanks," as used in this disclosure shall apply to integral and auxiliary fuel tanks of fixed wing aircraft, rotary wing aircraft, drones, and other types of machines capable of flight.

The foam material disclosed herein is intended to be used as a passive means to mitigate ignition in aircraft fuel tanks. The present inventive concept advantageously satisfies the aforementioned deficiencies in aircraft fuel tanks by providing a method of accomplishing ignition mitigation in aircraft fuel tanks using, in the preferred embodiment, molded polyurethane safety foam in coordinated shapes to fill one tank or multiple fuel tanks.

A preferred material for this inventive concept is polyurethane safety foam, which is a reticulated flexible foam composed of a skeletal matrix of lightweight interconnecting strands. For purposes of this disclosure, this particular material is referred to as "Reticulated Polyurethane Foam" ("RPF"). The RPF is also a biofuel-compatible material. There are also other varieties of foam material currently in existence, or that may be developed, which will function as well as RPF, including, but not limited to, polyether. Among these materials are polyethers, in which the repeating chemical unit contains a carbon-oxygen bond derived especially from an aldehyde or an epoxide.

Other advantages of the use of flexible foam include slosh attenuation, hydrodynamic ram attenuation, and forming a barrier against foreign object debris. These qualities are inherent properties of many foam-type materials, including RPF. As a surge or explosion mitigating agent, RPF attenuates the sloshing of fuel and, in some cases, eliminates the need for structural baffles within a tank. RPF further provides for a "smooth" sine wave motion of the fuel and reduces rapid redistribution of mass.

Hydrodynamic ram effect within a fuel tank or bladder cell is caused when a projectile impacts the exterior structure of the fuel tank. Ram force can be intensified when the tank is penetrated by a high explosive incendiary ("HEI") delayed detonating-type projectile. The matrix-type structure of RPF absorbs a portion of the shock wave as a projectile penetrates a fuel tank. Attenuation of hydrodynamic ram minimizes damage to the fuel tank structure by reducing the overpressure of the shock wave and helps to orient the round to prevent tumbling. The reduction of fuel tank structural damage can effectively reduce fuel discharge through the projectile entrance and exit points.

The foreign object debris barrier capability of RPF materials is an inherent beneficial effect rather than a product specification requirement. The RPF used in this inventive concept is a natural filter, due to its natural structure resembling a fibrous network. The finer the porosity of a material used as a fuel filter, the greater the entrapment of foreign objects and loose debris. The RFP material entraps loose debris within a fuel tank and minimizes the amount of debris entering an adjacent tank, the tank fuel lines, or the engine fuel system.

Explosion within a fuel tank containing kerosene-type fuels occurs as a result of the existence of flammable mixture in the ullage in combination with an ignition source. Examples of possible ignition sources include incendiary ammunition penetrating the fuel tank, static discharges, lightning strikes, switch refueling, and electrical shorts. Reticulated polyurethane foam (RPF) is in effect a three-dimensional fire screen, which minimizes the possibility of gasoline and kerosene-type (such as jet aircraft fuel) explosions under one or a combination of the following theories: the foam acts as a heat sink, (i.e., it removes energy from the combustion process by absorbing heat); it mechanically interferes with the compression wave that precedes the flame front in an explosion; and, the high surface-to-volume of reticulated polyurethane foam enables the strands to collect or coalesce the droplets of fuel, thus changing the vaporous mixture in the empty space above the fuel level (ullage), in the tank. Coalescing causes the vaporous mixture to become lean, which minimizes possible explosion.

The present inventive concept advantageously allows for greatly increased effectiveness in preventing the hazardous ignition of fuel within aircraft fuel tanks (satisfying all three phase requirements of 14 CFR § 25.981 compliance), is passive and therefore far less likely to experience a system failure, and available at a cost of implementation far less than that of alternative electronic solutions.

Experience in the aviation industry has shown that any fuel tank can be filled to maximum of about 85% capacity (not including a fuel swell of 12%) with the internal presence of reticulated polyurethane foam, not including any planned voids. The foam blocks should be kept clear of tank components such as the fuel inlets, fuel sensors, valves, float switches, and tank vents.

Other embodiments of a foam material and method in accordance with the above principles of the inventive concept may include alternative or optional additional aspects. One such, aspect would be use of foam of sufficient porosity and ignition mitigation properties composed of a synthetic or naturally occurring material other than polyurethane.

Another aspect of the present invention is the use of block foam material in interrelated, geometrical shapes which collectively conform to the interior shapes of fuel tanks.

An important aspect of the present invention is the frequent requirement to use alternate access ports of an aircraft fuel tank to insert the foam or foam blocks and position them in a distinct pattern to minimize any voids along tank walls. In the case of aircraft having internal fuel tanks integral to the wing, fuselage, cargo bays, or tail structure, it may be necessary to detach certain segments of the aircraft skin to provide access to the tank.

Another aspect of the present inventive concept is the utilization of a "fully packed" design concept. A fully packed system is defined as one where all potential fuel tank ullage is filled with reticulated polyurethane foam with cutouts for internal tank components only. This system is most desirable where minimal or no tank over-pressure can be tolerated.

An important objective of the present inventive concept is the utilization of a grossly "voided" design concept. A grossly voided system is defined as one where the fuel tank contains strategically positioned reticulated foam for explosion suppression. This method provides for minimal weight penalty and fuel retention, and is best suited for a fuel system that can withstand substantial overpressures.

These and various other advantages and features of novelty which characterize the inventive concept are pointed out in the accompanying descriptive matter and drawings which form a further part hereof. For a better understanding of the inventive concept its advantages, and the objects obtained by its use, reference should be made to the drawings in which are illustrated and described specific examples of a method and material in accordance with the present invention.

DETAILED DESCRIPTION OF THE INVENTION

The present inventive concept is based upon the use of precisely measured and contoured quantities of flexible foam material to be inserted into a tank constructed for the storage or retention of a flammable liquid. The principal intended use of this inventive concept is for the insertion of measured quantities of flexible foam material into the fuel tanks of aircraft. In the typical accomplishment of this method, interrelated sequential groupings of blocks of flexible foam material are used to fill specific fuel tank(s) of an aircraft.

However, in some instances, the flexible foam material may be cut and shaped into relatively small, uniformly-sked pieces so as to fit through tank access ports, service bays, or other available tank openings. The objects, features, and advantages of the concept presented in this document are more readily understood when referring to the accompanying drawings. The drawings, totaling seventeen (17) figures, show the basic components and functions of embodiments and/or the specific method steps. In the several figures, like reference numbers are used in each figure to correspond to the same component as may be depicted in other figures.

For illustrative purposes only, and not by way of limitation, the methods and systems described in this disclosure are disclosed as applicable to Boeing® 737 or Boeing® 767 series aircraft. This detailed description section is merely exemplary in nature and is not intended to limit the methods and uses shown in this inventive concept. The method disclosed may be utilized, with appropriate changes to the procedures, in a variety of types and locales of fuel tanks, whether on a vessel aircraft, or affixed to the ground or a structure.

There is no intent for the applicant to be bound or constrained by any expressed or implied theory(ies) set forth in the relevant technical fields, background, brief summary, or the present detailed description of the inventive concept as it relates to Boeing® 737 or Boeing® 767 aircraft. Further, there is no intent to confine the inventive method disclosed to one particular make, model, or series of aircraft, or particular configurations of aircraft fuel tanks.

The flexible foam material referred to in this document may be comprised of any of a variety of different foam materials, including different structures, textures, chemical compositions, and constituent qualities. A preferred foam material is reticulated polyurethane. Additionally, any material selected from the group consisting of polyethers in which the repeating unit contains a carbon-oxygen bond derived especially from an aldehyde or an epoxide may be used in the method set forth in this inventive concept.

By way of illustration only, and not as a limitation, the preferred embodiment of the present inventive concept depicts the use of contoured, interrelated, sequential groupings of foam blocks to fill a specific fuel tank or tanks of an aircraft. In situations where a fuel tank is relatively small, comprises an irregular shape, or its location makes it difficult to access, flexible foam pieces of certain shapes and sizes may be inserted through ports, openable panels, or other means, until the tank is determined to be fully satiated with the foam pieces.

When utilizing specifically-cut foam blocks, the blocks are engineered, fabricated, and/or sculpted to occupy a volumetric sector, or sectors, of the interior of a fuel tank. By utilizing the disclosed methods of installing blocks 50 or foam pieces to fill one or more fuel tanks of an aircraft, the aircraft operator prevents or minimizes the potentially damaging or catastrophic effects of fuel ignition, fire, and/or explosion.

For ease of explanation and illustrative purposes only, and not as a means of limitation, the disclosed method is described with regard to installation of the foam blocks into the center wing tank 112 of a Boeing® 737 aircraft 110 or the center wing box cavities 211, 212, of a Boeing® 767 aircraft 200.

Figure 1:
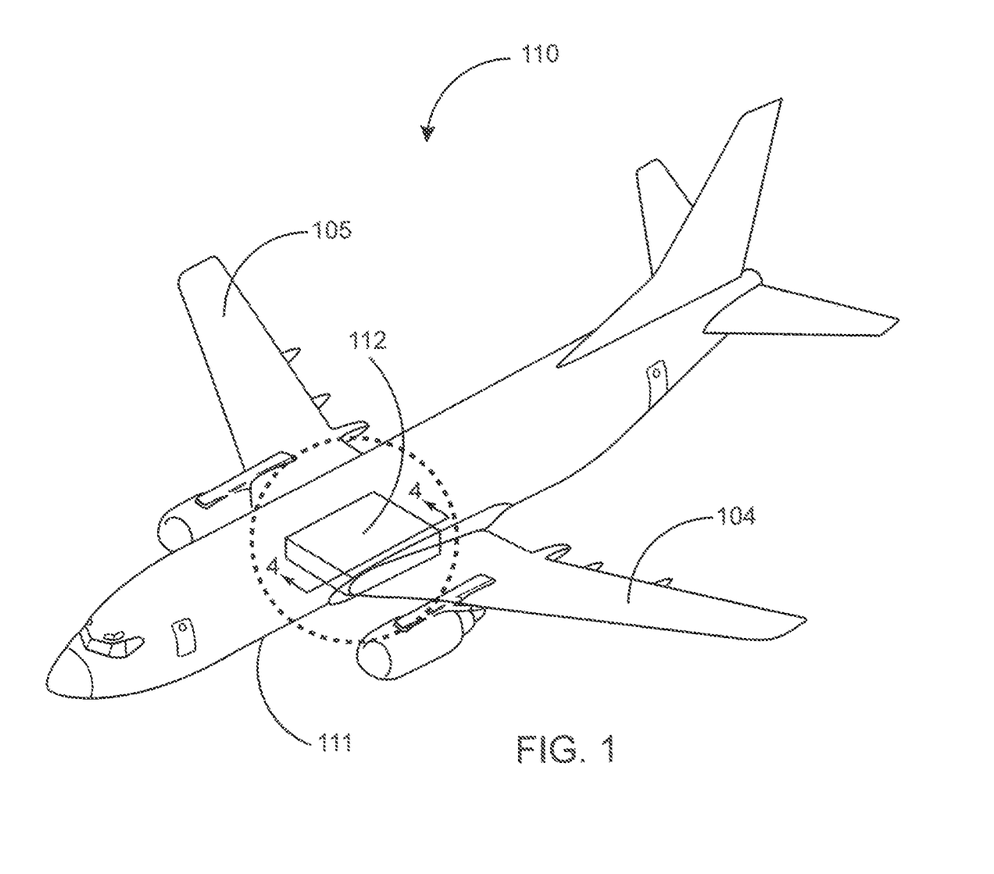
FIG. 1 illustrates a general overall fuselage-cutaway view of a Boeing® 737 jet 110 aircraft, further showing the location of the center wing fuel tank 112.

The discussion of the present inventive concept will be initiated with FIG. 1, which illustrates an overall view of a Boeing® 737 jet aircraft 110. FIG. 1 also depicts the fuselage 111, and a center wing tank 112, which is encircled. As in most similar jet aircraft, the predominance of the fuel load is generally carried in fuel tanks constructed within the left wing 104 and right wing 105, with equal quantities in each wing 104, 105. The wing-loaded fuel serves to add a counter-balancing weight to offset the upward wing structural bend due to the aerodynamic lift force generated by the wings 104, 105 when in flight. However, for substantially increased range, the aircraft 110 may be loaded with additional fuel in the center wing tank 112 and other internal tanks, if available.

Figure 2:
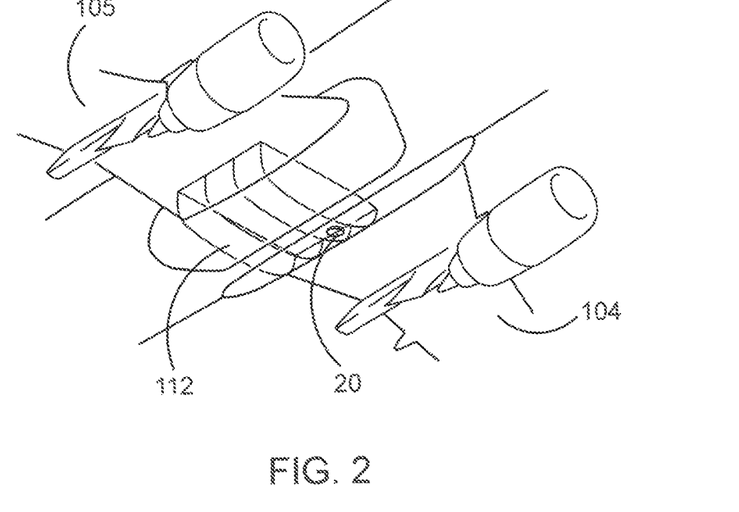
FIG. 2 shows the location of the center wing tank 112 of the Boeing® 737 aircraft, as would be seen looking through the bottom of the fuselage, and further, a tank access panel 20 utilized by maintenance personnel for ground servicing.

FIG. 2 is a stylized rendering looking upward at the undersurface of the Boeing® 737 fuselage 111, further revealing the location of the center wing tank 112. Also shown in FIG. 2 is a center wing tank access panel 20 utilized by maintenance personnel during ground servicing of this particular model and series of the Boeing® 737.

Figure 3:
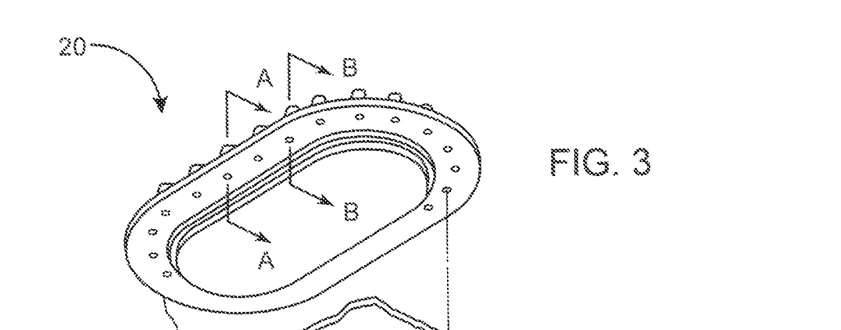
FIG. 3 depicts a close-up view of the access panel 20 to the center wing tank 112 shown in FIG. 2.
Figure 3A:
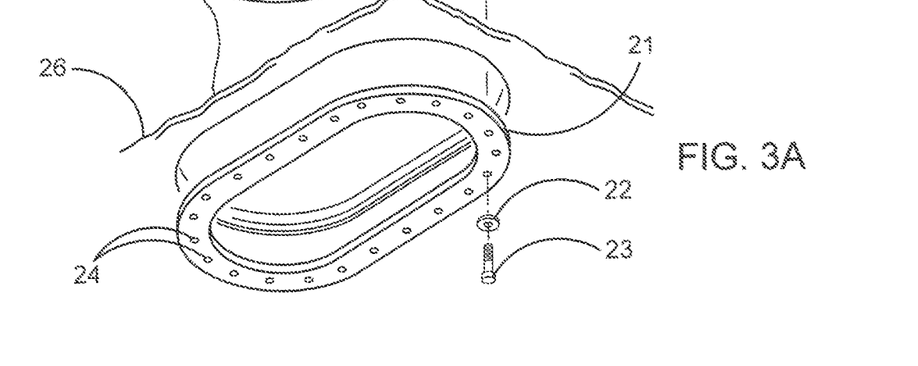
FIG. 3(A) is an illustration of the manner in which the access panel 20 of FIG. 2 is removed from the exterior of the center wing tank

FIG. 3 depicts an expanded view of the access panel 20 shown in FIG. 2. FIG 3(A) is an illustration of the manner in which the access panel 20 is removed from the exterior of the center wing tank 112, further showing a clamp ring 21, one of a plurality of washers 22, and one of a plurality of bolts 23, the washers 22 and bolts 23 utilized for insertion through apertures 24 for fastening the clamp ring 21 onto a lower center wing panel 26.

Figure 4:
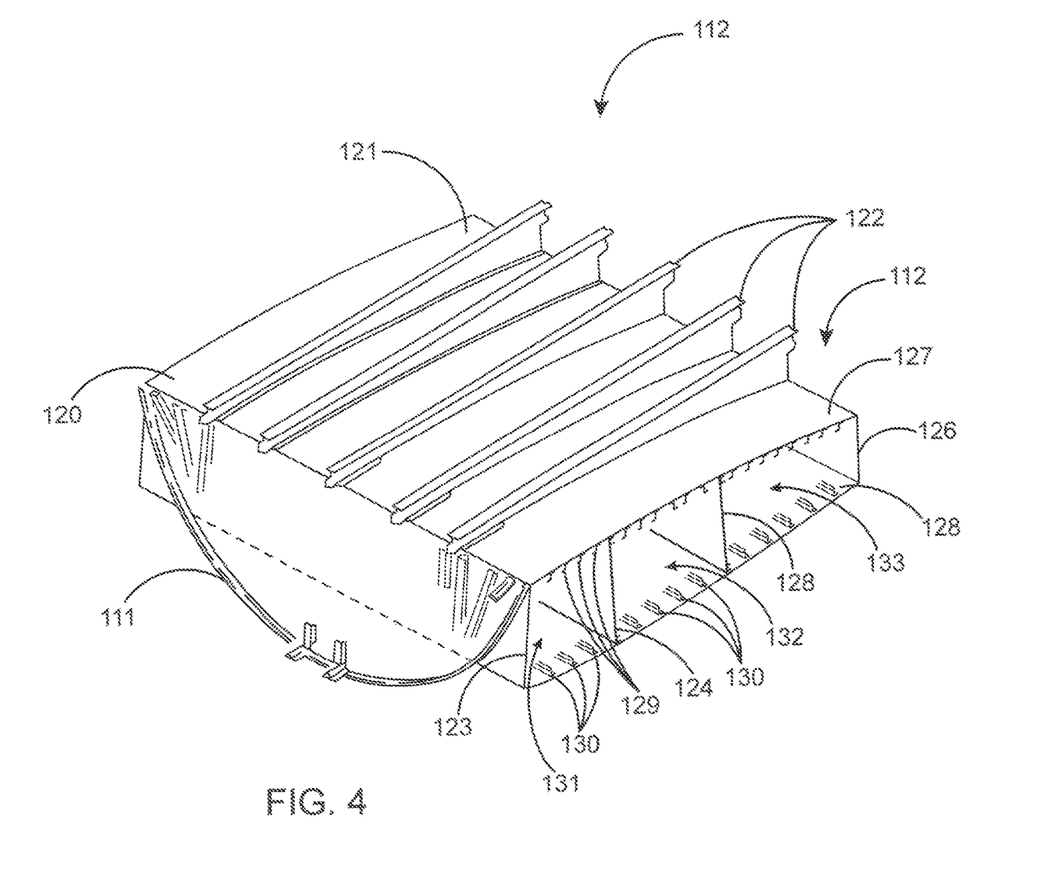
FIG. 4 shows a cutaway view of the structural members of the center wing tank 112, in accordance with section line 4-4 of FIG. 1.

FIG. 4 illustrates a stand-alone sectional view of the center wing tank 112, in accordance with section line 4-4 of FIG. 1. The structural integrity of the center wing tank 112, as positioned within the fuselage 111, substantially determines the internal contour of the center wing tank 112. The internal wing tank 112 contour, on initial determination of the quantity of foam material required, can be divided into a plurality of volumetric sectors, each sector amenable to acceptance of one, a few, or a substantial quantity of foam blocks or pieces conforming to each sector.

Referring to FIG. 4, the aircraft 110 structural members shown include a front spar 120, rear spar 121, floor beams 122, and a tank ceiling 127 abutting the aircraft floor beams 122. It is important to note that, as shown in FIG. 4, the center wing tank 112 comprises multiple compartments: a forward compartment 131, a center compartment 132, and an aft compartment 133. The three compartments 131, 132, 133 are separated by spanwise beam #2 124 and spanwise beam #1 125. In each of the three compartments 131, 132, 133, a fuel tank floor 128 comprises lower stiffeners 128 and the fuel tank ceiling 127 comprises upper stiffeners 129, which give additional rigidity to all three tank compartments 131, 132, and 133.

As a planning, consideration, it is important to assess the structural arrangement and means of access to each individual compartment of a tank with multiple compartments. This is vital in order to arrive at pre-determined working order as to which of the compartments should be the first to be filled with the foam material and in what sequence the remaining compartments should be filled.

As further discussion of the installation of aggregate foam blocks 50, explanation will be given of the methodology and process of measuring, sizing, and sculpting an exemplary foam block 50. Shown in FIG. 5 there is illustrated, by way of example, a profile view of a forward compartment foam block 51. This forward compartment foam block 51 is designated as such due to the fact that the contour of its outer perimeter corresponds to the shape, internal fittings and components of a specific, sector within the forward compartment 131 of the center wing tank 112.

Figure 5:
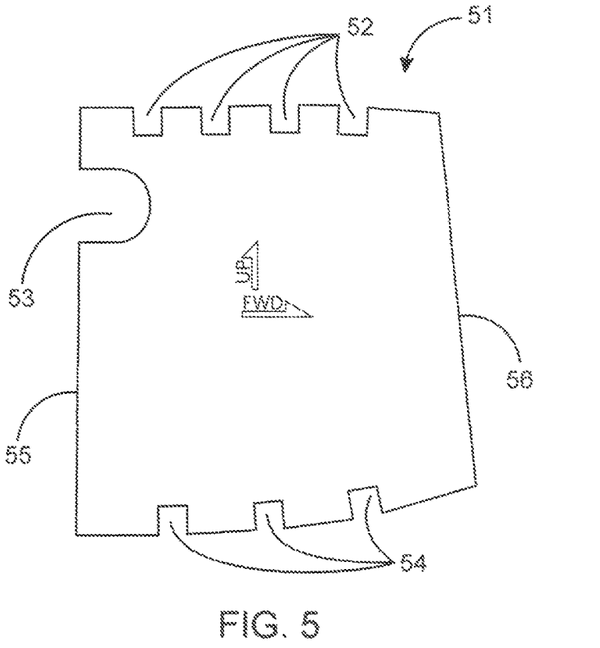
FIG. 5 illustrates the profile of a specifically-shaped foam block 51 precisely cut to fit the exact contour of a sector of the center wing tank 112.

In viewing FIG. 5, the topmost edge shows four upper cutouts 52 which provide clearance for upper stiffeners 129 of the forward compartment 131 as previously shown in FIG. 4. The left edge 55 of the foam block 51 is fabricated so as to correspond to the forward tank wall 123, and further shows an arcuate cutout 53 which provides clearance for a tank fuel pump, or other tank component. The bottommost section of the forward compartment foam block 51 illustrates three cutouts 54 which allow clearance for the three lower stiffeners 130 of the forward compartment 131, as shown in FIG. 4. Thus, the sector into which this foam block is placed manifests upper stiffeners 129, lower softeners 130, the forward tank wall 123, and a portion of a fuel pump.

Figure 5A:
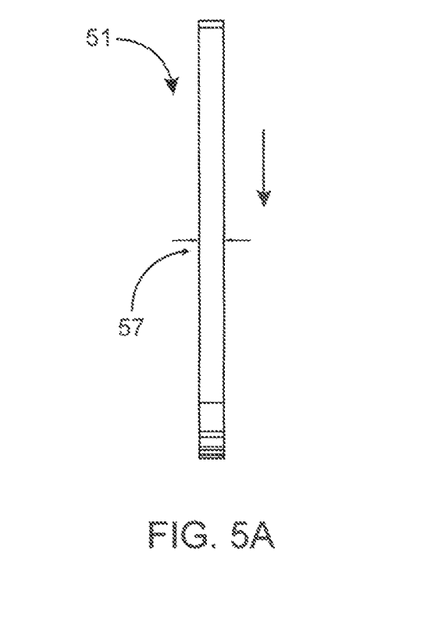
FIG. 5(A) presents a side view of the foam block 51 of FIG. 5.

The right edge 56 of the forward compartment foam block 51 corresponds to spanwise beam #2 124 as is depicted in FIG. 4. FIG. 5(A) is a view looking directly at the right edge 56 of the forward compartment foam block 51, and further showing the nominal width 57 of the forward compartment foam block 51. The dimensions of each of the foam blocks 50 have been measured and fabricated or sculpted in a size and contour which is completely dependent upon the size and contour of the fuel tank sector into which the specific foam block is to be installed.

As observed in FIG. 5, a directional UP arrow and a forward (FWD) arrow are printed on the surface of the foam block 51 to further guide an installer or technician in placing this particular foam block 51 in the correct orientation. Aircraft mechanics will also need foam block orientation and positioning guidance in the event one or more foam blocks 50 may need to be removed for internal tank or tank component inspection or maintenance during aircraft line operations.

The illustrated forward compartment foam block 51 of FIG. 5 is further given a part number (P/N) to indicate its exact location in the forward compartment 131 of the center wing tank 112. The part number also defines the order of its loading in the installation sequence of the aggregate of all foam blocks 50. The general manner of construction of the contour of the previously-described forward compartment foam block 51 is typical of the parameters to be met for each of the aggregate foam blocks 50 to be inserted in the forward compartment 131 of the center wing tank 112 of a Boeing® 737 series 400 aircraft as well as those foam blocks to be installed in the mid compartment and aft compartment of the center wing task 112. Similarly, the general manner of construction of the contour of any other foam block described above is typical of the parameters to be met for any foam block to be installed in any of a variety of aircraft fuel tanks.

The contours of the aggregate of all foam blocks 50 are a culmination of determinations made of the dimensions, profile, connections, attachments, and integral components of the inner surfaces of the fuel tank at the specifically designated sectors internal to each the forward, center, and aft compartments 131, 132, 133 of the center wing tank 112. This methodology is applicable to the determination of the size and contour of any foam block that may be fabricated for insertion into any of an unlimited variety of fuel tanks.

In planning a project for installation of foam blocks in the center wing tank 112, the initial process requires the manufacture and delivery of a pre-determined quantity of bulk foam material. The bulk forms generally measure approximately 12'×4'×2'. However, in everyday applicability, the overall dimensions and volumetric quantity of the bulk material is dependent upon the size and contour of the particular type of fuel tank into which the finished sculpted foam pieces are to be inserted.

During the manufacturing process, the bulk quantities of flexible foam may be colored, as required by the customer. In the preferred embodiment, a purple color facilitates the trouble-shooting of fuel contamination or irregularities associated with fuel lines, the engine fuel pump, filters, etc. Purple-colored flexible foam enables a determination whether an ignition event or possible foam deterioration has taken place.

By way of example only, in the case of the center wing tank 112 of a –300 series Boeing® 737 aircraft, engineering drawings are executed in a sequential series of scaled renderings of volumetric sectors of, for instance, the forward compartment 131 of the center wing tank 112. The profile of the compartment is measured and scaled at regularly-spaced increments along a line extending from a selected wall, tank floor, or the ceiling of the forward compartment 131. The measurements also take into consideration the placement of tank structural components and equipment. In the sane manner, engineering drawings are rendered for the interrelated sectors and contour of the center compartment 132 and aft compartment 133 of the center wing tank 112.

A plurality of cutouts of foam blocks 50 is made from the manufactured bulk foam, each block cut and sculpted according to the previously-described scaled renderings and further, each block cutout is progressively identified with a part number (P/N). Further, orientating symbols or text, such as "UP," "DOWN," "REAR," or "FORWARD," may be printed thereon. Cutting and shaping of the individual foam block cutouts from the bulk material may be accomplished by use of several optional means. These options include, but are not limited to mechanical blade type-cutting, specially designated/manufactured smooth blade type cutting tools, an extremely fine-toothed band saw-type blade, or a hot-wire type cutting tool.

Once the entirety of the aggregate foam blocks 50 required for the center wing tank 112 have been sculpted, each block is identified with a part number (P/N) and numerical or alphabetical sequencing corresponding to the sequential placement of the foam block into its corresponding, sector within each of the forward, center, or aft compartments 131, 132, 133. The foam blocks 50 are individually packaged and arranged in a stack or stacks which correspond to the orderly, sequential installation of the foam blocks 50 into the appropriate sector previously calculated. Further, detailed written instructions regarding the installation of the foam in each compartment are drafted and organized in a manual for the guidance of technicians who will install the foam blocks 50.

To install the foam blocks 50 into the center wing tank 112, it is preferable to position the aircraft 110 on a level surface and at a convenient height for access to the center wing tank 112. The access opening cover is then removed aid the foam blocks 50 are inserted through the access openings with the exercise of care to avoid tearing or abrading the foam blocks on the lip of the opening. FIG. 2, FIG. 3 and FIG. 3(A) illustrate the relative position of the access panel 20 of the center wing tank 112.

In many instances, installation of the foam blocks may be accomplished during the manufacturing or initial assembly stages of a fuel tank. In these situations, the job of the technicians or installers is much less problematic, since access to the interior of the tank is relatively straightforward and convenient. As a preliminary step, in installation of the flexible foam into fuel tanks that have been in service for a period of time, the cleanliness of the tank must first be ensured by draining the tank, purging, and then vacuuming the interior.

As stated previously, a very specific order of insertion of the foam blocks 50 must be followed so that all spaces that are intended to be filled in the center wing tank 112 are indeed filled. Empty spaces in the tank can only be those left by design, which is referred to as "planned voiding." The center wing tank 112 under discussion here should be filled with the foam blocks 50 fitted according to the sectors and pattern specified in the previously-mentioned engineering drawings and installation instructions.

Figure 6:
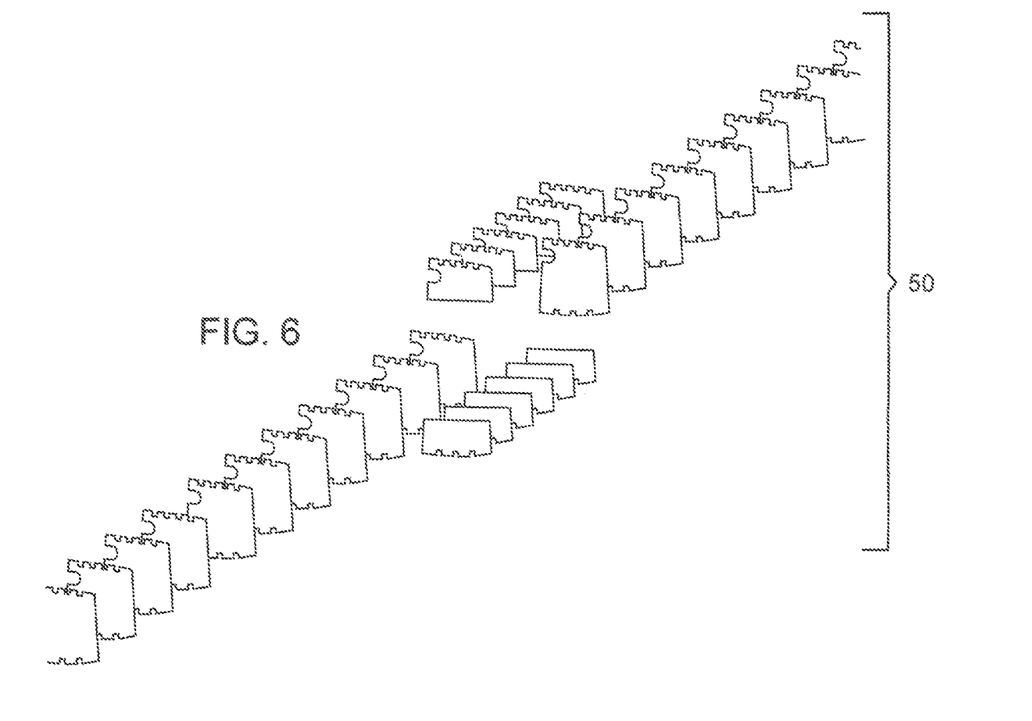
FIG. 6 presents a stylized diagram of the aggregate 50 of a plurality of sequentially-arranged, pre-cut foam blocks to be installed adjacent to one another, conforming to the contour of the forward compartment of the center wing tank 112.
Figure 7:
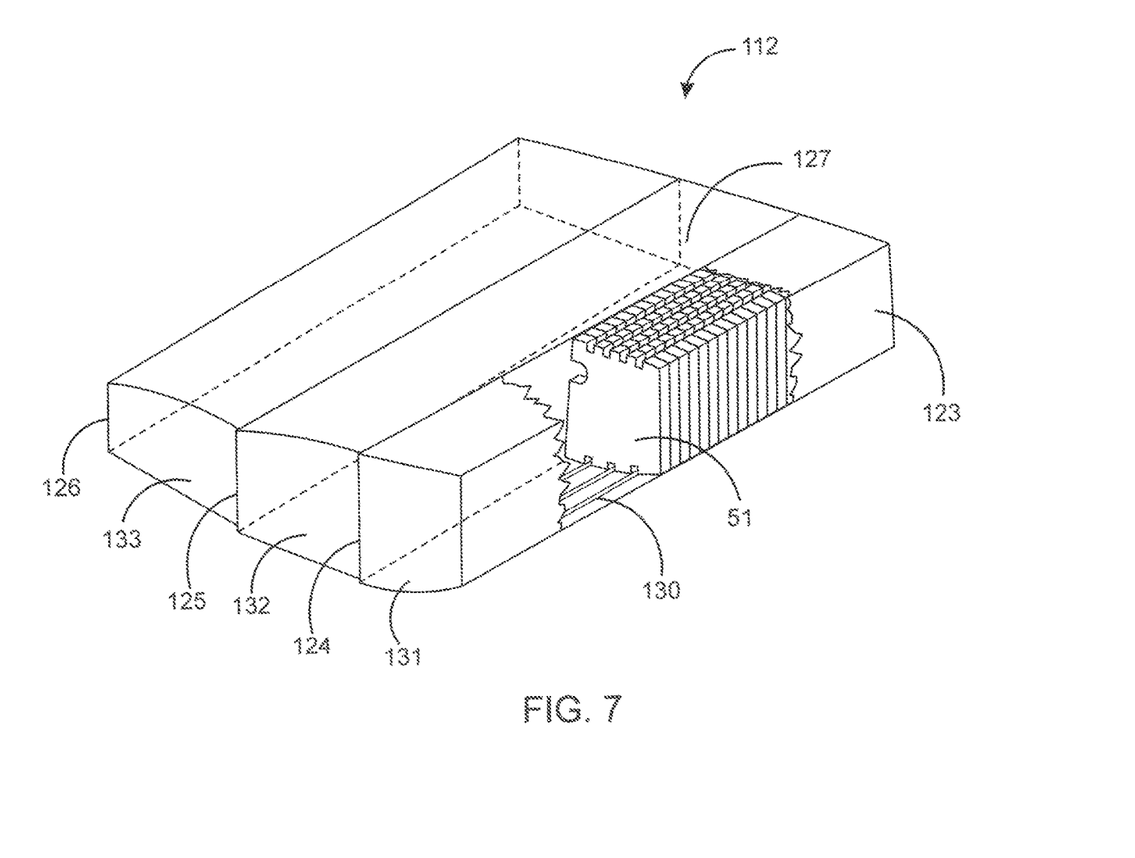
FIG. 7 is a stylized rendering of the center wing tank 112, further showing the packing arrangement of a plurality of foam blocks 51 properly installed in the forward compartment 131.

By way of further illustration, FIG. 6 depicts a diagram of a representative sample of a plurality of sequentially-arranged, pre-cut foam blocks 50 to be installed adjacent to one another, thereby conforming to the interior contour of the forward compartment 131 of the center wing tank 112 of the Boeing® 737 aircraft. Each of the blocks 50 has a shape and an order of installation which ultimately conforms to a specific contour of the forward compartment 131 at a particular sector of the forward compartment 131. FIG. 7 is a stylized "see-through" rendering of the center wing tank 112, further showing the packing arrangement of a plurality of blocks 50 in the process of being installed in the forward compartment 131 of the center wing tank 112.

Generally, the installation of the foam blocks 50 is accomplished by technicians entering through existing fuel tank access bays and openings. Further, a certain amount of the foam blocks 50 may be uploaded directly into the tank 112. On aircraft other than the Boeing® 737, existing fuel tank access openings that may be used for insertion and installation include, but are not limited to, maintenance access holes, wet and dry access bays found on non-cylindrical auxiliary fuel tanks, inspection holes in belly tanks, and the like. In the case of an aircraft having integral wing tanks, for instance, access may be necessary by means of removing a portion of the wing skin to access the fuel tank.

A very specific order of insertion of the foam blocks 50 must be followed so that all spaces that are intended to be filled in the tank are indeed filled. The method disclosed in this document must take into consideration the fact that all tanks designed to contain flammable liquid, including aircraft fuel tanks, manifest distinctive shapes and contours of the tank floor, ceiling, and walls.

Care is necessarily exercised to avoid tearing or abrading the foam on the lip of the access bays or holes. Shaped block foam pieces are inserted and positioned in a manner to ensure that the required internal tank void is filled and maximum ignition source prevention is achieved. The foam material selected for this disclosed method is considered to be "memory foam." Memory foam generally returns to its original shape after compression down to 40% of its original volume. A key feature of the present inventive concept is that the design and structure of the shaped block foam pieces allows them to be bent or slightly compressed in order to fit through existing access bays or ports of various aircraft fuel tanks.

In referring to FIGS. 8, 8A, 8B and 8C, it is to be noted that the majority of Boeing® 737 series 300 and series 400 aircraft are characterized by a first internal access port 18 between the aft compartment 133 and the center compartment 132 of the aircraft and a second internal, access port 19 between the center compartment 132 and the forward compartment 131. Further, a lower access panel 20 is depicted at the midpoint of the forward compartment 131, which coincides with the underside of the fuselage.

In the installation of foam blocks 50 into the center wing tank 112 of a Boeing® 737 aircraft, the procedure begins with the right side of the aft compartment 133 of the center wing tank 112. The installer(s) must gain access to the aft compartment 133 first, through a lower access panel 20 located on the underside of the fuselage 111 of the aircraft, as shown in FIG. 2 and FIG. 3. Access is sequentially accomplished through the second internal access port 19, and the first internal access port 18.

Figure 8:
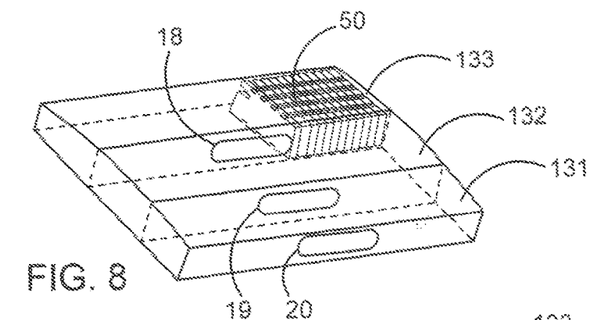
FIG. 8 depicts the first stages of installation of foam blocks 50 on the right side of the aft compartment 133.
Figure 8A:
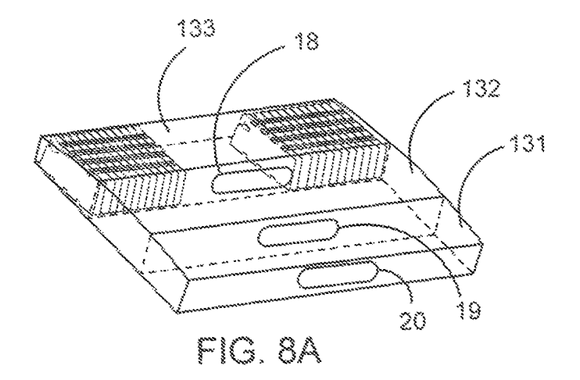
FIG. 8A shows the beginning of installation of foam blocks on the left side of the aft compartment 133b, the right side of the compartment having been completed
Figure 8B:
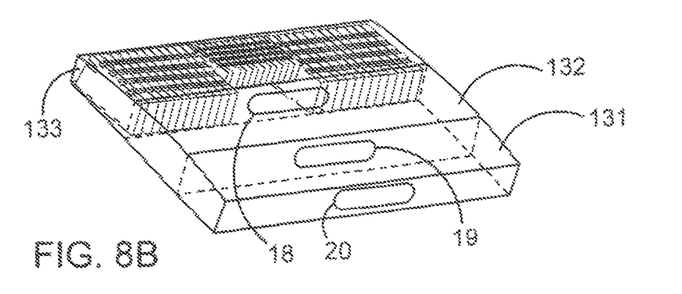
FIG. 8B depicts the start of installation of foam blocks is the middle section of the aft compartment 133.
Figure 8C:
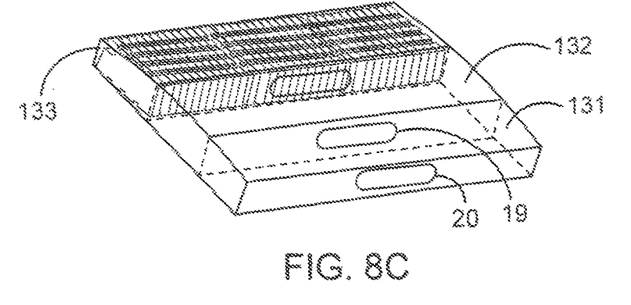
FIG. 8C depicts the completion of installation of foam blocks in the aft compartment 133.

FIG. 8 depicts a quantity of foam blocks 50 having been installed on the right side of the aft compartment 133. Next, the installer(s) work the left side of the aft compartment 133, FIG. 8A showing the completion of installation of foam blocks on the left s de of the aft compartment 133, the right side of the compartment 133 having been completed. As the installer(s) begins exiting the aft compartment 133 through the first access port 18, he/she installs RPF blocks 50 in the middle section of the aft compartment 133, as shown in FIG. 8B. FIG. 8C depicts the completion of installation of foam blocks 50 in the aft compartment 133.

Figure 9:
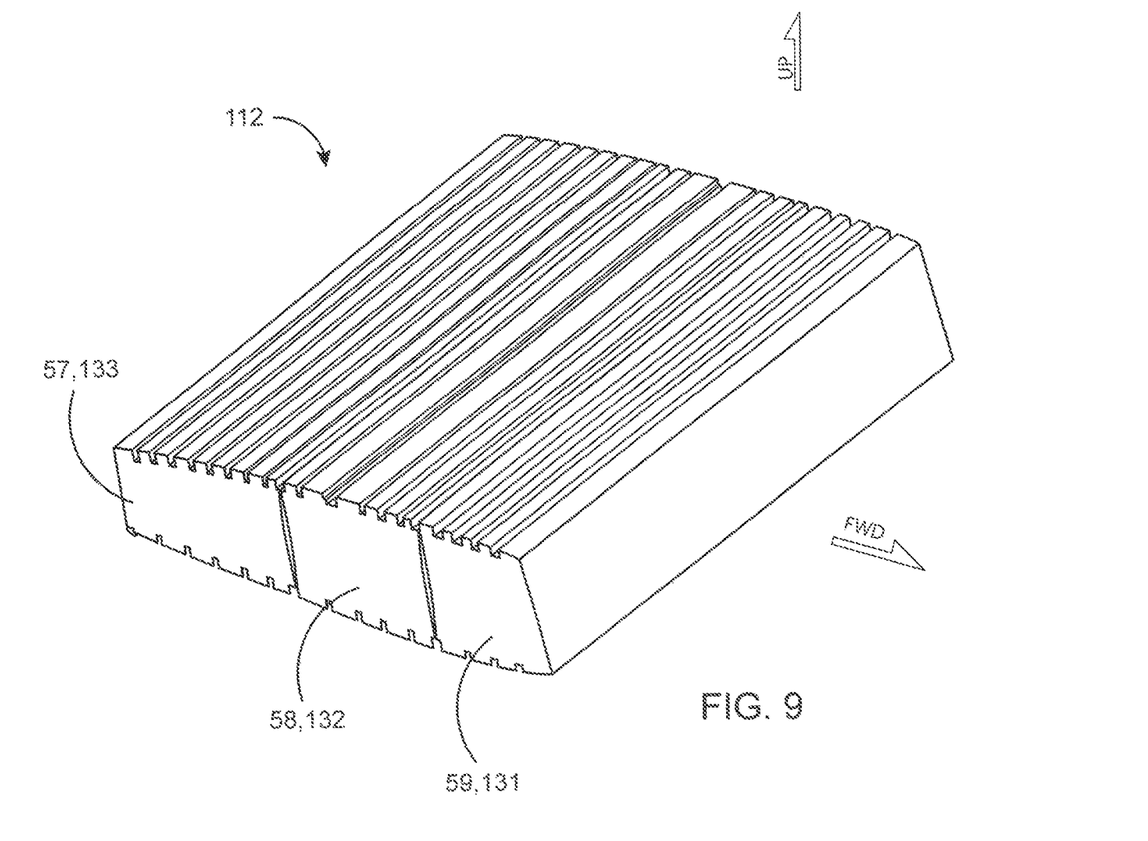
FIG. 9 is a stylized rendering of the resultant installation of all foam blocks in the forward 131, center 132, and aft 133 compartments of the center wing tank of a typical Boeing® 737 aircraft.

FIG. 9 illustrates a stylized diagram of the resultant installation of all foam blocks in the forward, mid, and aft compartments 131, 132, 133 of the center wing tank 112 of a typical Boeing® 737 aircraft.

Figure 10:
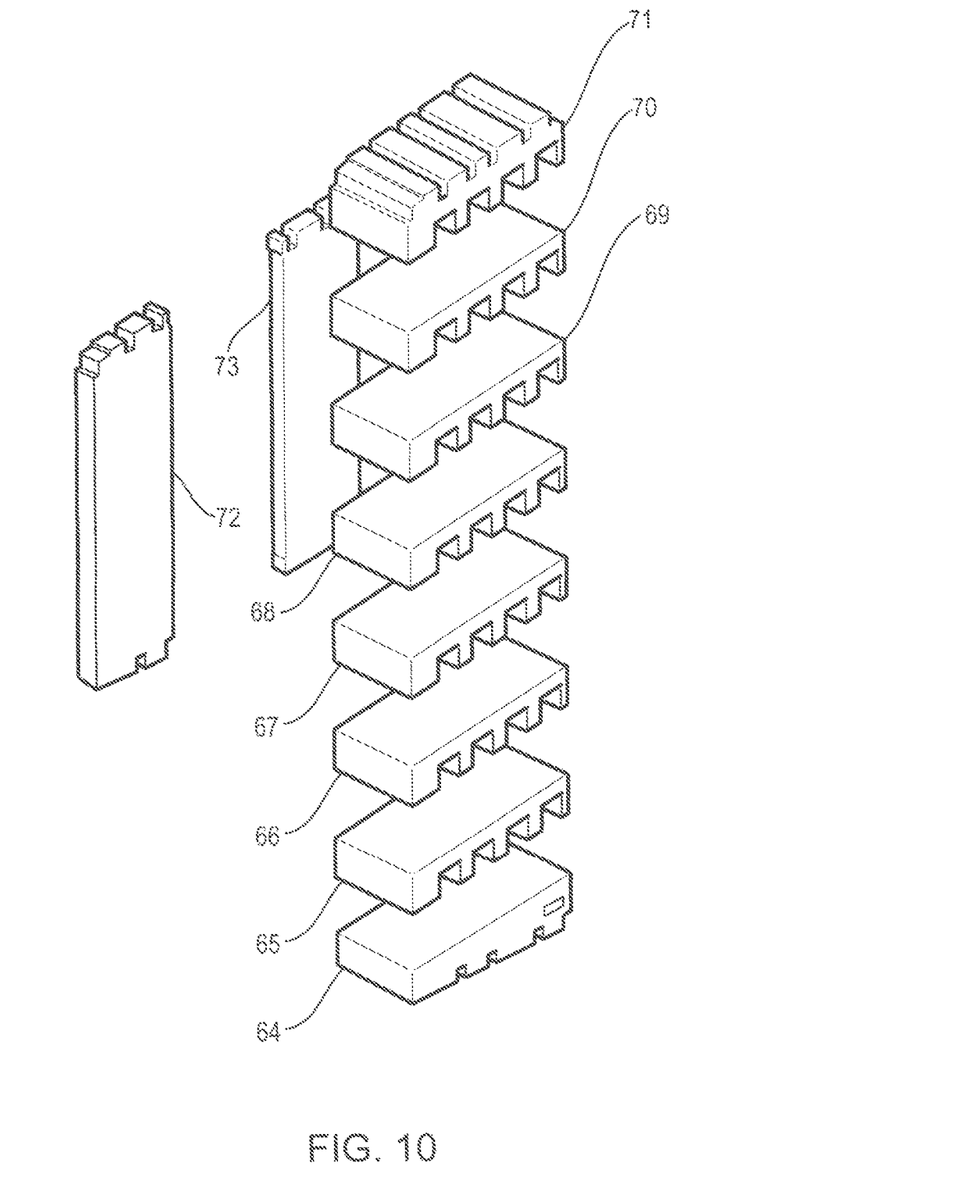
FIG. 10 depicts an exploded view of exemplary foam blocks 64-73 which comprise one of twelve (12) vertically-oriented columns sculpted to fit within the first center wing box cavity 211 of a Boeing® 767 BR aircraft 200.
Figure 11:
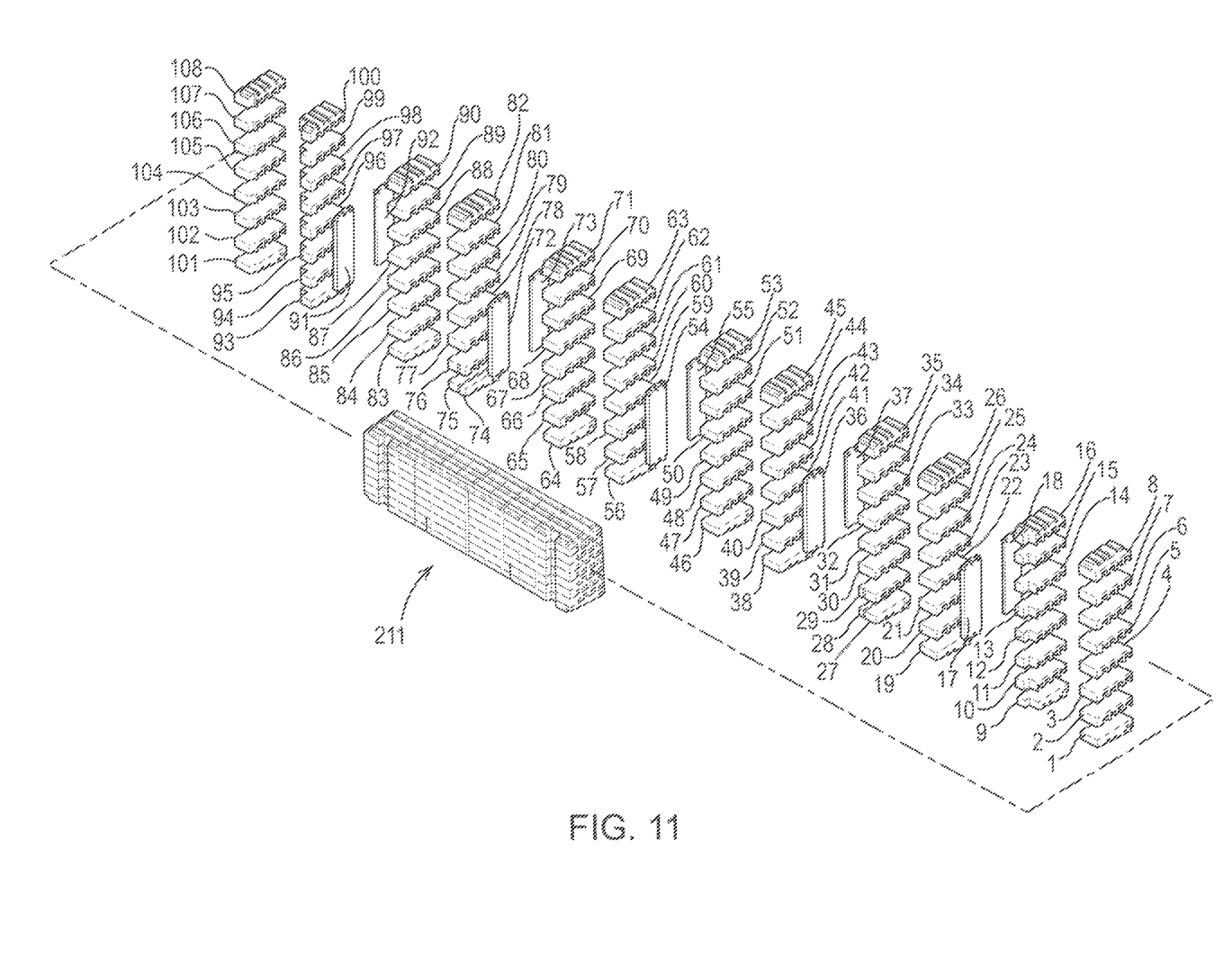
FIG. 11 illustrates an exploded view of the aggregate of all foam blocks (circled numbers 001-108) necessary for a complete filling of foam blocks into the first center wing box cavity 211 of a Boeing® 767 ER aircraft 200.
Figure 12:
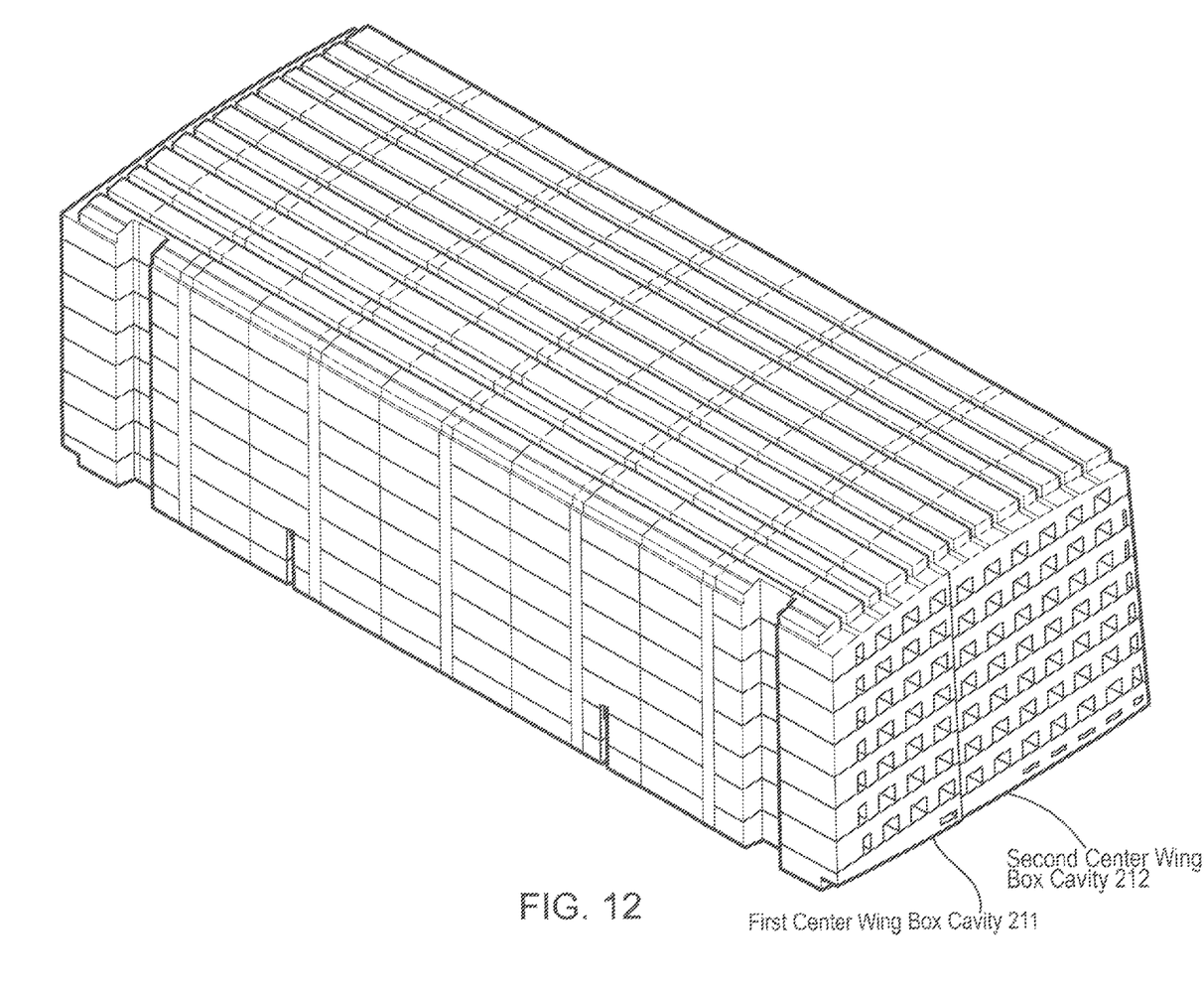
FIG. 12 depicts the joining of the aggregate of foam blocks required to fill both wing box cavities 211, 212 of the 767 BR center wing tank 200.

For illustrative purposes, renderings of the method of foam filling of the center wing tank 210 of a Boeing® 767 ER aircraft 200 is shown in FIG. 10, FIG. 11, and FIG. 12. For informational purposes, the specific model 767 ER illustrated is constructed with a center wing tank 210 consisting of a first center wing box cavity 211 and a second wing box cavity 212.

Beginning with FIG. 10, there is shown an exploded view of a column of ten foam blocks 64-73 which comprise one of twelve (12) vertically-oriented columns designed to fill contiguous sectors of the first center wing box cavity 211 of the Boeing 767® ER aircraft 200. Each block 64-73 manifests cutouts and a shape to fit the first center wing box cavity 211 contour and/or structural components corresponding to the sector into which the blocks 64-73 are sculpted to fit. FIG. 11 depicts an exploded view of the aggregate of all foam blocks (circled numbers 001-108) which are necessary to comprise a complete filling of foam material into the first center wing box cavity 211.

In turning to FIG. 12, there is shown a stylized rendering of the joining of the assemblies of foam blocks required to fill both the first center wing box cavity 211 and the second center wing box cavity 212 of the Boeing® 767 ER 200. The foam blocks depicted as filling the second center wing box cavity 212 are structured and arranged similarly to the required assembly of foam blocks for the first center wing box cavity 211. As a result, the union of these two groups of foam blocks completely fills the center wing tank 210 of the 767 ER aircraft 200 with ignition mitigating foam.

When conducting any of the above described methods and procedures, the fitted size, shape and installation of any aggregate of flexible foam material should be such that no internal tank voids longer than 2.5 feet exist (with the internal tank fuel probes installed). All flexible foam blocks must be kept clear of the tank components such as the fuel ports, fuel probes, float switches, and tank vents. The "planned" voiding areas around these structures should not exceed a volume of 10% of the total fuel tank volume and there should be no additional connecting voids between any of the planned void spaces. The minimum space of foam filled area required between the planned void areas is three (3.0) inches if maximum void size is used.

While the present invention has been described above in terms of specific embodiments, it is understood that the invention is not limited to these disclosed embodiments. It is not intended to be exhaustive or to limit the invention to the precise form disclosed. Many modifications, variations, and other embodiments of the invention will come to mind of those skilled in the art to which this invention pertains, and which are intended to be and are covered by both this disclosure and hereafter submitted claims. If is indeed intended that the scope of the invention should be determined by proper interpretation and construction of the hereafter submitted claims and their legal equivalents, as understood by those of skill in the art relying upon the disclosure in this specification and the attached drawings. It is intended that the scope of the invention is not limited to any particular aircraft, or to any particular type of tank constructed to hold flammable liquid.

What is claimed is:

1. A method for providing ignition mitigation for a fuel tank, comprising:
    determining interior dimensions of the fuel tank;
    providing a bulk quantity of foam material;
    cutting the foam material into a plurality of foam blocks, wherein:
        at least two foam blocks among the plurality of foam blocks have unique profiles, as compared to each other, corresponding to different inner surfaces within a compartment of the fuel tank; and
        the plurality of foam blocks comprise an upper cutout for clearance around an upper stiffener of the fuel tank, an arcuate cutout for clearance around a fuel pump of the fuel tank, and a lower cutout for clearance around a lower stiffener of the fuel tank;
    positioning the plurality of foam blocks within the fuel tank with the upper cutout around the upper stiffener of the fuel tank, the arcuate cutout around the fuel pump of the fuel tank, and the lower cutout around the lower stiffener of the fuel tank; and
    filling the fuel tank with fuel and verifying a quantity of the fuel in the fuel tank, wherein:
    a first foam block among the plurality of foam blocks comprises the upper cutout:
    a second foam block among the plurality of foam blocks comprises the lower cutout;
    the first foam block and the second foam block are stacked in a vertically-oriented column within the fuel tank;
    the plurality of foam blocks further comprises a third foam block placed between the first foam block and the second foam block in the vertically-oriented column; and
    the third foam block comprises at least one channel void to reduce weight.

2. The method of claim 1, wherein the foam material comprises reticulated polyurethane foam.

3. The method of claim 1, wherein the foam material comprises polyether foam.

4. The method of claim 1, wherein at least one foam block among the plurality of foam blocks comprises a specified color.

5. The method of claim 1, wherein the fuel tank comprises at least one of a center wing tank or an auxiliary tank.

6. The method of claim 1, further comprising, before positioning the plurality of foam blocks within the fuel tank, purging and vacuuming the fuel tank.

7. The method of claim 1, wherein cutting the foam material further comprises:
    cutting the foam material into a second plurality of foam blocks, wherein at least two foam blocks among the second plurality of foam blocks have unique profiles, as compared to each other, corresponding to different inner surfaces of the fuel tank within a second compartment of the fuel tank.

8. The method of claim 1, wherein cutting the foam material further comprises:
    cutting a plurality of upper cutouts including the upper cutout in the first foam block to provide clearance around upper stiffeners including the upper stiffener in the fuel tank.

9. The method of claim 8, wherein cutting the foam material further comprises:
    cutting a plurality of lower cutouts including the lower cutout in the second foam block to provide clearance around lower stiffeners including the lower stiffener in the fuel tank.

10. The method of claim 9, wherein cutting the foam material further comprises:
    cutting the arcuate cutout in at least one foam block among the plurality of foam blocks to provide clearance around the fuel pump.

11. The method of claim 1, further comprising arranging the plurality of foam blocks in a stack corresponding to a sequential installation at respective sectors within at least one compartment of the fuel tank.

12. The method of claim 1, further comprising forming a directional indicator in or on at least one foam block among the plurality of foam blocks to indicate an installation orientation at a sector within at least one compartment of the fuel tank.

13. The method of claim 1, further comprising marking an identifier on at least one foam block among the plurality of foam blocks to indicate an installation location at a sector within at least one compartment of the fuel tank.

14. The method of claim 13, wherein the identifier further indicates a relative order of installation of the at least one foam block, in sequence, among the plurality of foam blocks within the at least one compartment of the fuel tank.

15. A method of forming foam blocks for fuel tank ignition mitigation, comprising:
    providing a bulk quantity of foam material;
    cutting the foam material into a plurality of foam blocks, wherein:
        at least two foam blocks among the plurality of foam blocks have unique profiles, as compared to each other, corresponding to different inner surfaces within a compartment of a fuel tank; and
        the plurality of foam blocks comprise an upper cutout for clearance around an upper stiffener of the fuel tank and a lower cutout for clearance around a lower stiffener of the fuel tank; and
    positioning the plurality of foam blocks within the fuel tank with the upper cutout around the upper stiffener of the fuel tank and the lower cutout around the lower stiffener of the fuel tank, wherein:
    a first foam block among the plurality of foam blocks comprises the upper cutout;
    a second foam block among the plurality of foam blocks comprises the lower cutout;
    the first foam block and the second foam block are stacked in a vertically-oriented column within the fuel tank;
    the plurality of foam blocks further comprises a third foam block placed between the first foam block and the second foam block in the vertically-oriented column; and
    the third foam block comprises at least one channel void to reduce weight.

16. The method of claim 15, further comprising cutting the foam material into a second plurality of foam blocks, wherein at least two foam blocks among the second plurality of foam blocks have unique profiles, as compared to each other, corresponding to different inner surfaces of the fuel tank within a second compartment of the fuel tank.

17. The method of claim 15, wherein the foam material comprises reticulated polyurethane foam.

18. The method of claim 15, wherein the foam material comprises polyether foam.

19. The method of claim 15, wherein at least one foam block among the plurality of foam blocks comprises a specified color.

20. The method of claim 15, wherein the fuel tank comprises at least one of a center wing tank or an auxiliary wing tank.

21. The method of claim 15, further comprising:
filling the fuel tank with fuel and verifying a quantity of the fuel in the fuel tank.

22. The method of claim 21, further comprising, before positioning the plurality of foam blocks within the fuel tank, purging and vacuuming the fuel tank.

23. The method of claim 15, wherein cutting the foam material further comprises:
cutting a plurality of upper cutouts including the upper cutout in the first foam block to provide clearance around upper stiffeners including the upper stiffener in the fuel tank.

24. The method of claim 23, wherein cutting the foam material further comprises:
cutting a plurality of lower cutouts including the lower cutout in the second foam block to provide clearance around lower stiffeners including the lower stiffener in the fuel tank.

25. The method of claim 24, wherein cutting the foam material further comprises:
cutting at least one arcuate cutout in at least one foam block among the plurality of foam blocks to provide clearance around a fuel pump in the fuel tank.

26. The method of claim 15, further comprising arranging the plurality of foam blocks in a stack corresponding to a sequential installation at respective sectors within at least one compartment of the fuel tank.

27. The method of claim 15, further comprising forming a directional indicator in or on at least one foam block among the plurality of foam blocks to indicate an installation orientation at a sector within at least one compartment of the fuel tank.

28. The method of claim 15, further comprising marking an identifier on at least one foam block among the plurality of foam blocks to indicate an installation location at a sector within at least one compartment of the fuel tank.

29. The method of claim 28, wherein the identifier further indicates a relative order of installation of the at least one foam block, in sequence, among the plurality of foam blocks within the at least one compartment of the fuel tank.

30. The method of claim 15, wherein the plurality of foam blocks fit within the fuel tank to fill a total volume of the fuel tank with open voids of no larger than a certain size and less than a percentage of the total volume of the fuel tank.

31. The method of claim 15, wherein a fourth foam block among the plurality of foam blocks is oriented vertically, spans the vertically-oriented column from the first foam block to the second foam block, and covers the at least one channel void on one side of the vertically-oriented column.

* * * * *